United States Patent
Mélédo (10) Patent No.: US 12,245,723 B2
(45) Date of Patent: Mar. 11, 2025

(54) EVEN COOKING OF FOODSTUFFS BY MEANS OF A DEVICE ALLOWING STATIC ISOLATION, FOCUSING, CHANNELING AND MODULATION OF ENERGIES

(71) Applicant: Hervé Mélédo, Sucé-sur-Erdre (FR)

(72) Inventor: Hervé Mélédo, Sucé-sur-Erdre (FR)

(*) Notice: Subject to any disclaimer, the term of this patent is extended or adjusted under 35 U.S.C. 154(b) by 687 days.

(21) Appl. No.: 17/426,166

(22) PCT Filed: Feb. 6, 2020

(86) PCT No.: PCT/FR2020/050208
§ 371 (c)(1),
(2) Date: Jul. 28, 2021

(87) PCT Pub. No.: WO2020/161442
PCT Pub. Date: Aug. 13, 2020

(65) Prior Publication Data
US 2022/0095832 A1 Mar. 31, 2022

(30) Foreign Application Priority Data
Feb. 6, 2019 (FR) ........................... 1901172

(51) Int. Cl.
*A47J 37/06* (2006.01)
*F24C 7/04* (2021.01)
*F24C 15/22* (2006.01)

(52) U.S. Cl.
CPC ....... *A47J 37/0635* (2013.01); *A47J 37/0676* (2013.01); *F24C 7/046* (2013.01); *F24C 15/22* (2013.01)

(58) Field of Classification Search
CPC ............... A47J 37/0623; A47J 37/0629; A47J 37/0635; A47J 37/0676; A47J 37/0709;
(Continued)

(56) References Cited

U.S. PATENT DOCUMENTS

| 2,993,431 A | 7/1961 | Weishaus |
| 4,386,558 A | 6/1983 | Holman et al. |

(Continued)

FOREIGN PATENT DOCUMENTS

| CN | 108392094 A | 8/2018 | |
| EP | 0399178 B1 * | 10/1994 | ............. F24C 15/22 |

(Continued)

OTHER PUBLICATIONS

International Search Report issued on May 4, 2020 in corresponding International application No. PCT/FR2020/050208; 5 pages.

*Primary Examiner* — Hung D Nguyen
(74) *Attorney, Agent, or Firm* — Maier & Maier, PLLC (57) ABSTRACT

A C-shaped or U-shaped open radiant cooking appliance including a lower cooking cassette; an upper cooking cassette; and a posterior part together defining a cooking chamber; the appliance having a proximal portion including at least one proximal radiant element; and a distal portion including at least one distal radiant element, at least one isolation element separating the at least one distal radiant element from the at least one proximal radiant element; the isolation element including at least one first reflector configured to direct the radiation emitted by the at least one distal radiant element towards the cooking chamber.

17 Claims, 5 Drawing Sheets

(58) Field of Classification Search
CPC ......... A47J 37/0807; F24C 7/04; F24C 7/046; F24C 7/06; F24C 15/22; F24C 15/24
See application file for complete search history.

(56) References Cited

U.S. PATENT DOCUMENTS

| | | |
|---|---|---|
| 5,805,769 A | 9/1998 | Cook et al. |
| 2011/0059210 A1 | 3/2011 | Veltrop et al. |

FOREIGN PATENT DOCUMENTS

| | | |
|---|---|---|
| EP | 2 286 701 A1 | 2/2011 |
| EP | 2 374 385 A1 | 10/2011 |
| JP | H0320532 A | 1/1991 |
| JP | 2017190898 A | 10/2017 |

\* cited by examiner

Prior Art

EVEN COOKING OF FOODSTUFFS BY MEANS OF A DEVICE ALLOWING STATIC ISOLATION, FOCUSING, CHANNELING AND MODULATION OF ENERGIES

FIELD

The present invention relates to the field of cooking appliances. The present invention relates in particular to an open radiant cooking appliance allowing an even distribution of the heat inside the cooking chamber of said appliance to obtain even cooking without any intervention during cooking.

BACKGROUND

During the past years, numerous cooking appliances having various characteristics have been developed. In particular, radiant cooking appliances, in particular infrared-radiation cooking appliances, have been developed for the following reason: the infrared radiation allied to steam without pressure in a non-hermetic cooker allows cooking at low temperature, namely cooking and browning temperatures not exceeding 100° C. This low-temperature cooking mode is particularly advantageous in that it not only makes it possible to preserve the nutriments contained in the foodstuffs such as vitamins, oligoelements and mineral salts, but also to preserve the natural flavour of the foodstuffs. This cooking mode is therefore recognised to be very healthy. On the other hand, the cooking systems present in traditional ovens generally recommend cooking temperatures above 100° C.

The patent EP 2 374 385 (shown in FIG. 1) describes an infrared-radiation cooking appliance making it possible to cook the foodstuffs contained in a cooking casserole. This infrared-radiation cooking appliance is an assembly formed by:
- a lower part and an upper part parallel to each other; the lower and upper parts each comprising a cooking cassette; said cooking cassette comprising at least one radiant element;
- two lateral vertical parts that provide the parallel and distanced holding of the lower and upper parts of the cooking appliance;
- a vertical rear part that closes this assembly.

In the cooking appliances that comprise a frontal part open to the outside, one of the known problems is the loss of heat at the front, which means that the part of the cooking casserole placed at the frontal part of the open radiant cooking appliance receives less heat than the rear part of the casserole. As a result the cooking of the foodstuffs inside the casserole is not even.

Illustration of Cooking by the Prior Art

A cooking casserole containing a potato gratin was placed in said cooking appliance. Means for measuring the temperature of the gratin were also placed in the cooking casserole. During the cooking of the gratin, the difference in temperature between the front and rear of the cooking casserole reached more than 20° C. This temperature differential caused unevenness of the cooking and also of the browning of the foodstuffs.

It has been found that this unevenness is furthermore variable according to the sizes of the cooking casseroles. The larger the cooking casserole and the more it approaches or even projects beyond the front part of said cooking appliance, the more the cooking differences are amplified.

The present invention aims to solve this problem of unevenness and loss of heat in open radiant ovens. Thus the invention proposes a novel radiant open cooking appliance allowing even cooking.

SUMMARY

The invention therefore relates to an open radiant cooking appliance having a C shape or a U shape and comprising a lower cooking cassette; an upper cooking cassette; and a posterior part defining together a cooking chamber; said appliance comprising a proximal portion comprising at least one proximal radiant element; and a distal portion comprising at least one distal radiant element, at least one isolation means separating the at least one distal radiant element from the at least one proximal radiant element; said isolation means comprising at least one first reflector configured for directing the radiation emitted by the at least one distal radiant element towards the cooking chamber.

According to one embodiment, at least one isolation means of the lower part of the appliance also comprises at least one second reflector. According to one embodiment, said first and said second reflectors are connected together by at least one third reflector. According to one embodiment, at least one isolation means partially surrounds a distal radiant element; said at least one isolation means comprising an opening directed towards the cooking chamber.

According to one embodiment, the inclination of the first reflector with respect to the lower horizontal surface of the lower cooking cassette forms an angle β of between 70° and 120°. According to one embodiment, the inclination of the first reflector with respect to the horizontal surface of the upper cooking cassette is inclined with respect to the plane of the upper part, forms an angle β of between 70° and 120°. According to one embodiment, the inclination of the second reflector with respect to the lower horizontal surface of the lower cooking cassette forms an angle α of between 85° and 140°. According to one embodiment, the inclination of the second reflector with respect to the upper horizontal surface of the lower cooking cassette forms an angle α' of between 85° and 140°.

According to one embodiment, the proximal portion comprises a number of proximal radiant elements of between 1 and 20. According to one embodiment, the distal portion comprises at least one distal radiant element. According to one embodiment, the power of the at least one distal radiant element is identical to or greater than the power of the at least one proximal radiant element. According to one embodiment, the opening of an isolation means of the distal portion is configured to be parallel to and/or opposite the opening of an isolation means of the distal portion. According to one embodiment, the open radiant cooking appliance comprising at least one additional reflector partially closing the lateral surface of the cooking chamber. According to one embodiment, the cooking cassettes are attached to internal flanks that comprise at least one additional elongate isolation means closed at the ends thereof.

In a preferred embodiment, the cooking appliance according to the invention comprises frontal deflectors in the distal portion of said appliance.

In a preferred embodiment, the cooking appliance according to the invention comprises at least one frontal air deflector in the distal portion of said appliance. Ideally it has two frontal air deflectors disposed symmetrically with respect to a central plane of symmetry separating the open cooking appliance into two symmetrical parts to obtain a lower cooking cassette and an upper cooking cassette.

In a preferred configuration, each of the deflectors has a planar surface and a surface oblique with respect to the planar surface so as to orient the central hot air towards the external louvres.

In another embodiment, at least one radial element of the appliance according to the invention receives a layer of isolating and partially reflective material around and along its face opposite to the cooking chamber. Preferentially, all the radial elements receive said layer.

Finally, in another alternative embodiment, at least one radial element of the appliance according to the invention receives independent heating elements disposed longitudinally with respect to said element so that the ends of the radial element can be selectively heated and the central zone not heated. In a preferred embodiment, the heating elements are heating resistances.

In the present invention, the following terms are defined as follows:

"Cooking chamber" here refers to the space wherein a cooking casserole is placed. The cooking chamber comprises cooking cassettes, which integrate one or more parallel radiant elements.

"C shape" or "U shape": refers to the overall shape formed by a first and a second surface parallel to each other and a vertical third surface in contact with the first and second surfaces. These three surfaces are attached to vertical U-shaped elements of the cooking appliance, thus providing their parallel and distanced holding. The terms "C shape" and "U shape" also refer to any shape similar to a C shape or to a U shape.

"Distal end": here refers to the end of the distal portion furthest away from the posterior part.

"Lower part" of the "C" or of the "U" refers to the part parallel to the upper part. The lower part of the device is generally in contact with a support, for example but not limitatively a table.

"Upper part" refers to the part parallel to the lower part.

"Posterior part" refers to the rear part of a cooking appliance according to the invention, this posterior part being opposite to the open frontal part of said cooking appliance.

"Frontal part" refers to the open frontal part of a cooking appliance according to the invention.

"Isolation means" refers to one or more means making it possible in particular:
1. to reduce losses of useful active heat coming from the radiant elements; and/or
2. to avoid the passage of stray cool air coming from outside the cooking appliance; and/or
3. to isolate the cooking chamber from the flows of internal air coming in particular from the pulsed air inside the cooking appliance; this flow of internal air is cool and the purpose of it is to cool the outer casing of the cooking appliance for safety purposes; and/or
4. to optimise the transfer and focusing and to reduce the loss of radiation (in particular heat); these means being able to act by contact, reflection or concentration of said radiation; and/or
5. to create isolating zones.

"Open": here refers to a cooking appliance that does not have a front door and optionally not lateral sides.

"Partially closed" here refers to the fact that a covering or closing means that closes an opening up to a half, up to a quarter or up to a twentieth, in particular a lateral opening.

"Proximal portion" refers to the portion of the lower or upper part closest to the posterior part.

"Distal portion" refers to the portion of the lower or upper part closest to the frontal part.

"Radiant element" here refers to any radiating object, i.e. any object that emits radiation and in particular infrared radiation; in particular any object emitting heat by radiation. Radiation also means any radiant effect.

"Reflector" here refers to a surface that is capable of reflecting and/or concentrating the energy of the radiation that it receives.

DETAILED DESCRIPTION

The following detailed description will be understood best in conjunction with the figures. For illustrative purposes, the appliance is mounted in its preferential embodiments. Thus the present application is not limited to certain structures or embodiments illustrated. The figures are not to scale and must not be understood as limiting the scope of the claims to the embodiments illustrated.

The present invention relates to an open oven or open radiant cooking appliance.

Figure 1:
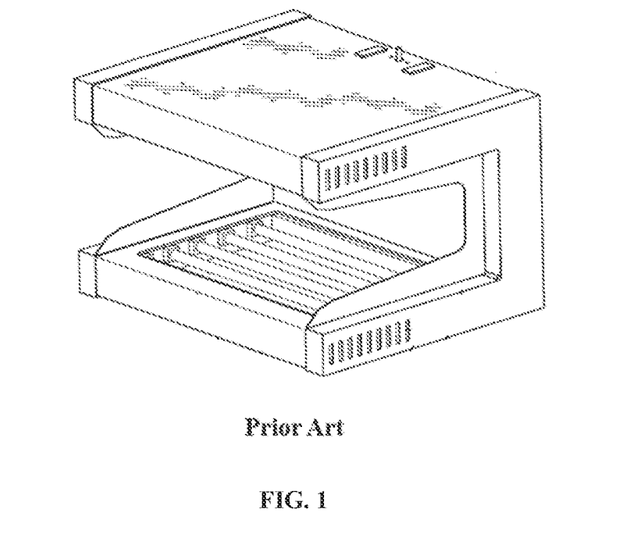
FIG. 1 illustrates an open radiant cooking appliance of the prior art.

FIG. 1 shows an open radiant cooking appliance of the prior art having a C shape or a U shape and comprising:
a horizontal lower part;
a horizontal upper part;
a vertical posterior part;
U-shaped vertical lateral parts that thus provide holding thereof parallel to and at a distance from the lower part and the upper part.
Said lower part, said upper part and said posterior part define the cooking chamber that receives the cooking casseroles, said cooking chamber comprising a lower cooking cassette formed by a few radiant elements.

Figure 2:
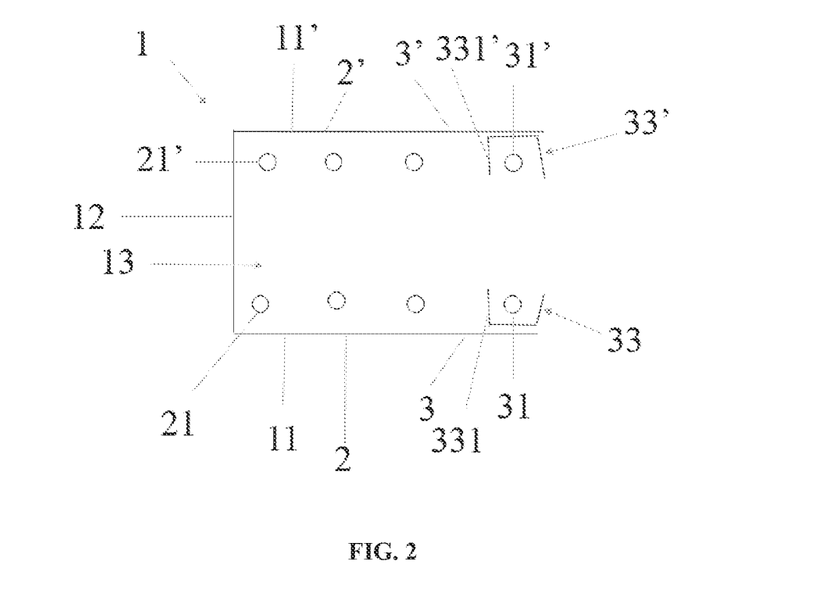
FIG. 2 is a transverse view of the cooking chamber of a cooking appliance according to the invention.

FIG. 2 shows an open radiant cooking appliance 1 according to the invention having a C shape and a U shape and comprising:
- a horizontal lower cooking cassette 11;
- a horizontal upper cooking cassette 11';
- a vertical posterior part 12;
- U-shaped vertical lateral parts that thus provide the holding parallel to and at a distance from the lower cooking cassette 11 and the upper cooking cassette 11'.

Said lower cooking cassette 11, said upper cooking cassette 11' and said posterior part 12 define the cooking chamber 13 that receives the cooking casseroles and contains at least two upper and lower cooking cassettes consisting of radiant elements 21, 21', 31, 31' the lower part 11 and the upper part 11' comprise respectively
- a proximal portion 2, 2', comprising at least one proximal radiant element 21, 21';
- a distal portion 3, 3' comprising at least one distal radial element 31, 31';
- the distal portion 3, 3' comprising at least one and preferably two to five isolation means 33, 33' that preferably comprise at least one first reflector 331, 331' configured to direct the radiation emitted by at least one distal radiant element 31, 31' towards the cooking chamber 13.

Isolation/Concentration No. 1

In the present invention, the first isolation/concentration means 33, 33' has the advantage of isolating the distal radiant elements 31, 31' from the proximal radial elements 21, 21'.

According to a preferred embodiment, said at least one isolation means 33, 33' comprises at least one first reflector 331, 331' configured:
a) by means of the proximal face thereof, for directing and/or concentrating the radiation emitted by the at least one radiant element 21, 21' of the proximal part 2, 2' towards the proximal part of the cooking chamber 13; and
b) by means of the distal face thereof, for directing and/or concentrating the radiation emitted by the at least one radiant element 31, 31' of the distal part 3, 3' of the cooking cassette towards the distal part of the cooking chamber 13.

The advantage of the invention is avoiding a phenomenon known from the prior art, wherein the distal part of the cooking casserole (even of small size) is heated at a lower temperature than the proximal part, a phenomenon that is amplified in the case of the use of a large casserole.

In the prior art, in the absence of the reflectors 331 and 331', the radiation from the heating radiant elements goes beyond lower and upper distal ends of the small cooking casserole and therefore help to increase the temperature differential and therefore cooking differential between the proximal and distal face of said small cooking casserole.

Isolation/Concentration No. 2

Figure 3A:
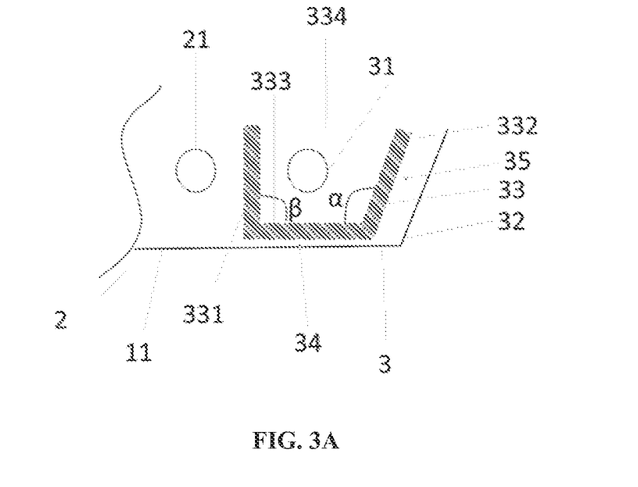
FIG. 3A is a transverse view of the lower part of the distal part of the lower cooking cassette.

FIG. 3A shows an embodiment wherein the at least one isolation means 33 of the distal part of the lower cooking cassette also comprises at least one second reflector 332 that separates the at least one distal radiant element 31 from the distal end 32 of the distal portion 3 of the lower cooking cassette.

The distal part of these reflectors makes it possible to direct and/or concentrate the radiation emitted by the at least one distal radiant element 31 towards the distal part 3 of the cooking cassette towards the distal part of the cooking chamber 13 and therefore consequently towards the distal part of the cooking casserole that is housed inside the cooking chamber 13.

Figure 3B:
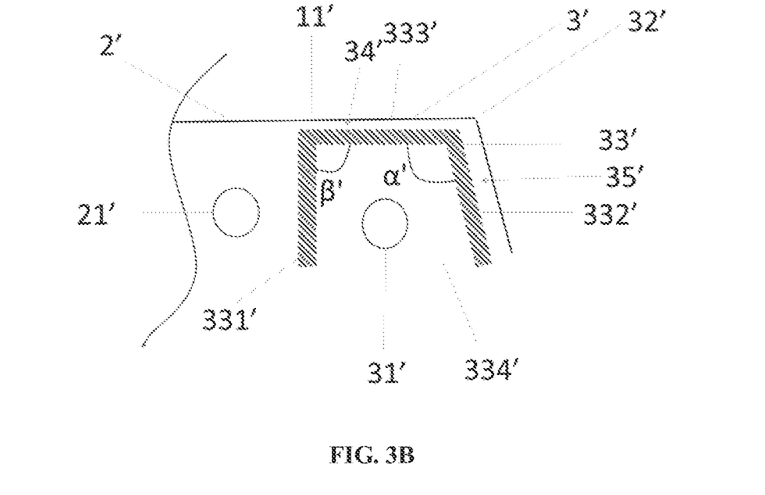
FIG. 3B is a transverse view of the upper part of the distal part of the upper cooking cassette.
Figure 4:
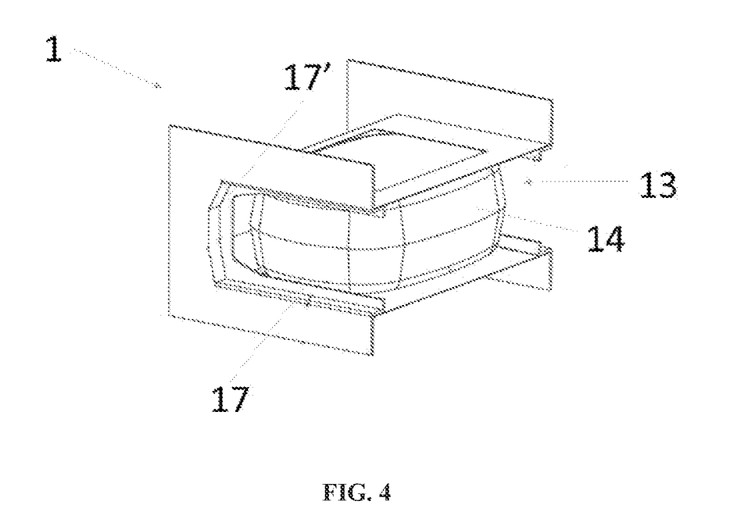
FIG. 4 illustrates the open radiant cooking appliance according to the invention, including the external flanks equipped with additional reflectors on its lateral faces.
Figure 5:
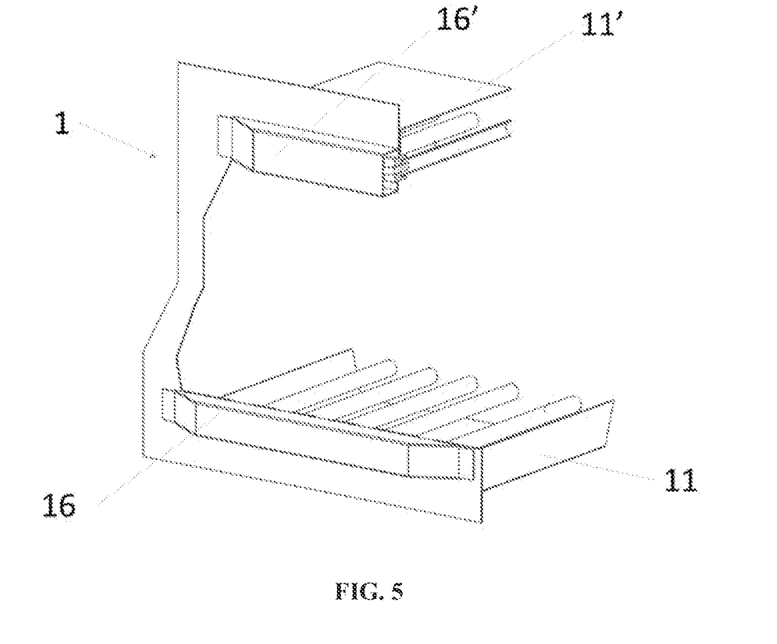
FIG. 5 illustrates the interior of the open radiant cooking appliance according to an embodiment of the invention comprising U-shaped interior flanks and elongate isolation means.

FIG. 3B shows an embodiment wherein the at least one isolation means 33' of the distal part of the upper cooking cassette also comprises at least one second reflector 332' that separates the at least one distal radiant element 31' from the distal end 32' of the distal portion 3' of the upper cooking cassette.

The distal part of these reflectors makes it possible to direct and/or concentrate the radiation emitted by the at least one distal radiant element 31' towards the distal part 3' of the cooking cassette towards the distal part of the cooking chamber 13 and therefore consequently towards the distal part of the cooking casserole that is housed inside the cooking chamber 13.

The embodiments in FIGS. 3A and 3B may of course be combined, and the cooking device according to the invention may comprise at least one lower second reflector 332 and/or at least one upper second reflector 332'.

Thus this second reflector or reflectors provide a complementary solution to the first reflector or reflectors to avoid the drawback of the prior art wherein the distal part of the casserole, in particular when it is a large cooking casserole, is at a lower temperature than in the proximal part thereof.

The cooking of the foodstuffs housed in the cooking casserole is thus, by virtue of this embodiment, much more even, and this in particular when the casserole is a large cooking casserole.

Another advantage of these second reflectors is that the radiant elements 31, 31' can be switched on in a manner selected by the user, for example only when a large cooking casserole is being used.

In one embodiment, an isolation means consists of a reflector and an isolating static air film that separates the reflector 332, 332' from the distal end of the cooking cassette to reduce any thermal loss and to reduce the diffusion of heat beyond the cooking cassette, which has the additional advantage of thus reducing the temperature of the frontal part of the cooking apparatus for safety purposes.

Isolation/Concentration No. 3

According to an embodiment presented in FIG. 3A, the at least one isolation means 33 of the lower cooking cassette 11 also comprises at least one third reflector 333 that orients the radiation from the radiant elements towards the cooking chamber and isolates the bottom of the cooking cassette. In a preferred embodiment, said first reflector 331 and said second reflector 332 are connected together by said at least one third reflector 333, by their distal ends with respect to the cooking chamber. In one embodiment, the reflectors 331, 332 and 333 surround at least one radiant element 31.

According to an embodiment presented in FIG. 3B, the at least one isolation means 33' of the upper cooking cassette 11' also comprises at least one third reflector 333' that orients the radiation from the radiant elements towards the cooking chamber and isolates the upper part of the cooking cassette. In a preferred embodiment, said first reflector 331' and said second reflector 332' are connected together by said at least one third reflector 333', by their distal end with respect to the cooking chamber. In one embodiment, the reflections 331', 332' and 333' surround at least one radiant element 31'.

Said first reflector 331, 331', second reflector 332, 332' and said at least one third reflector 333, 333' alone or in combination with each other have the advantage of making it possible to increase, to improve, to orient and/or to channel the concentration of the radiation emitted by the at least one radiant element 31, 31'. It should be noted that the radiant elements 31, 31' may have identical or differentiated powers.

According to one embodiment, the at least one isolation means 33, 33' partially surrounds the at least one distal radial element 31, 31'; said at least one isolation means 33, 33' comprising an opening 334, 334' directed towards the cooking chamber 13. In this embodiment, the radiation emitted by the at least one distal radiant element 31, 31' with different or identical powers will solely be directed towards the cooking chamber 13.

According to one embodiment, the first reflector 331, 331', the at least one second reflector 332, 332', and/or the at least one third reflector 333, 333' is a reflective surface, which may be made from any adapted material, in particular metal or ceramic. According to a preferred embodiment, the reflectors are made from stainless steel.

According to one embodiment, the inclination of the first reflector 331 with respect to the lower horizontal surface of the lower cooking cassette 11 forms an angle β of between 70° and 120° (FIG. 3A). According to one embodiment, the inclination of the first reflector 331' with respect to the upper horizontal surface of the upper cooking cassette 11' forms an angle (3' of between 70° and 120° (FIG. 3B). According to one embodiment, the angles 13 and (3' are identical. According to another embodiment, the angles 13 and (3' are different.

According to one embodiment, the inclination of the second reflector 332 with respect to the lower horizontal surface of the lower cooking cassette 11 forms an angle α of between 85° and 140° (FIG. 3A). According to one embodiment, the inclination of the second reflector 332' with respect to the upper horizontal surface of the upper cooking cassette 11' forms an angle α' of between 85° and 140° (FIG. 3B). According to one embodiment, the angles α and α' are identical. According to another embodiment, the angles α and α' are different.

The angles of inclination of the at least one first reflector 331, 331' and the angles of inclination of the at least one second reflector 332, 332' are designed to improve, orient and/or channel the radiation emitted by the at least one distal radiant element 31, 31'.

According to one embodiment, the proximal portion 2, 2' comprises a number of proximal radiant elements 21, 21' of between 1 and 20, preferably between 1 and 10, and the radiant elements have identical or different powers. In a preferential embodiment, the open radiant cooking appliance comprises 1 to 10, preferably 1 to 5 proximal radiant elements in the proximal portion of the lower part, 1 to 10, preferably 1 to 5 proximal radial elements in the proximal portion of the upper part.

According to one embodiment, the distal portion 3, 3' comprises a number of distal radiant elements 31, 31' of between 1 and 10, preferably between 1 and 6, and the radiant elements have identical or different powers. In a preferential embodiment, the open radiant cooking appliance comprises 1 to 5, preferably 1 to 2 distal radiant elements in the distal portion of the lower part, 1 to 5, preferably 1 to 2 distal radiant elements in the distal portion of the upper part.

According to one embodiment, the at least one proximal radiant element 21, 21' and/or the at least one distal radiant element 31, 31' have an elongate shape. According to one embodiment, the lower proximal radiant elements 21 may have a length different from the upper proximal radiant elements 21'. According to one embodiment, the at least one distal radiant element 31 may have a length different from the distal radiant element 31'. According to one embodiment, the at least one radiant proximal element 31 and the at least one proximal radiant element 21 may have identical lengths. Likewise the at least one distal radiant element 31' and the distal radiant element 21' may have identical lengths.

According to one embodiment, the longitudinal axis of the proximal radiant elements 21, 21' and of the distal radiant elements 31, 31' are parallel. According to one embodiment, said longitudinal axis of the proximal radiant element 21, 21' and/or said longitudinal axis of the distal radiant element 31, 31' are parallel to the distal end 32, 32' of the cooking cassettes 11, 11'.

According to one embodiment, the at least one first reflector 331 and the at least one second reflector 332 extend over the whole of the width of the lower cooking cassette 11. Width means the distance, along the axis, that is parallel to the distal end 32. According to one embodiment, this width is defined by the distance separating the internal flanks of the apparatus, to which the lateral ends of said cooking cassettes are attached.

According to one embodiment, the at least one first reflector 331' and the at least one second reflector 332' extend over the whole of the width of the upper cooking cassette 11'. Width means the distance, along the axis, that is parallel to the distal end 32'.

According to one embodiment, the cooking cassettes 11 and 11' may have different dimensions.

According to one embodiment, the power of the at least one distal radiant element 31, 31' is greater than the power of the at least one proximal radiant element 21, 21'. According to one embodiment, the power of the at least one distal radiant element 31, 31' is on average 1 to 7 times greater than the minimum power of the at least one proximal radiant element 21, 21'. The unitary power of the proximal radiant elements 21, 21' and distal radiant elements 31, 31' may vary unitarily along the cooking cassettes 11 and 11'. The powering up and the adjustment of the intensity of the radiant elements 21, 21' and distal radiant elements 31, 31' can be differentiated unitarily along the cooking cassettes 11 et 11'. The radiant elements 31, 31' may operate simultaneously or not, with different intensities or not. The distal radiant elements 21, 21', may operate simultaneously or not, with different intensities or not.

According to one embodiment, the opening 334 of the at least one isolation means 33 of the distal portion 3 of the lower cooking cassette 11 is configured to be parallel to and/or opposite the opening 334' of the at least one isolation means 33' of the distal portion 3' of the upper cooking cassette 11'.

According to one embodiment, the isolation means 33 and 33' are not similar, nor do they have similar heights. According to one embodiment, the reflectors 331', 332' are lowered so as to move as close as possible to the cooking casserole for better control of the channeling of the energy diffused by the radiant element or elements 31'.

Lateral and Rear Isolation of the Cooking Chamber

In order to limit lateral entries of air that interfere between the top and the bottom of the casseroles, according to one embodiment, the lateral and rear ends of the cooking chamber 13 comprise lateral vertical reflectors that partially or totally close the lateral and rear openings of the cooking chamber 13. In one embodiment, said reflectors cover 5 to 50% of the lateral and rear openings of the cooking chamber 13.

Isolation of the Ends of the Radiant Elements

According to one embodiment, the lateral parts of the lower cooking cassettes 11 and/or upper cooking cassettes 11' comprise isolating lateral enclosures closed at their rear and front ends; according to one embodiment, the apparatus according to the invention furthermore comprises at least one additional elongate isolation means referred to as isolation enclosures that isolate the ends of the radiant elements. In this embodiment, the energy loss coming from the end of the radiant elements is very greatly reduced. In addition, these isolation enclosures have the advantage of isolating the ends of the radiant elements from the cool air flows coming from the fans 40, 40' (cf. FIG. 6) attached to the rear face of the cooking apparatus.

Figure 6:
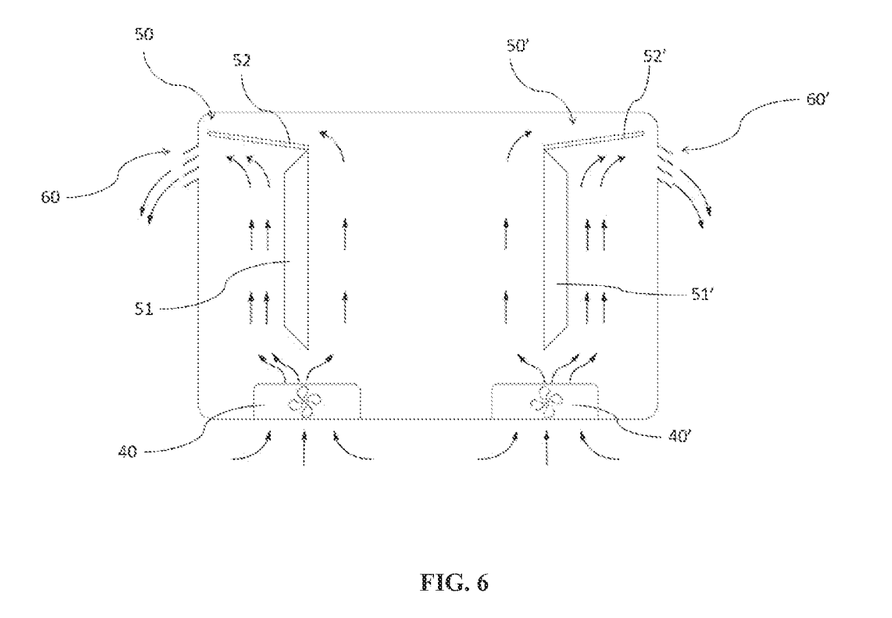
FIG. 6 illustrates the flow of hot air inside the open radiant cooking appliance according to an embodiment of the invention comprising fans and ventilation louvres in a cross section.

With reference to FIG. 6, in order to overcome an insufficiency of lateral discharge of the central hot air in the open radiant cooking appliance according to the invention, frontal air deflectors 50, 50' are envisaged, the purpose of which is to extract the central hot air towards external louvres 60, 60'.

It is possible to have one air deflector or two air deflectors 50 and 50'. In the case where there are two air deflectors 50, 50' as illustrated in FIG. 6, preferentially, the two air deflectors are symmetrical with respect to a central plane of symmetry separating the open cooking appliance 1 into two symmetrical parts so as to obtain a lower cooking cassette 11 and an upper cooking cassette 11'.

Each of the deflectors 50, 50' has a planar surface 51, 51' and an oblique surface 52, 52' able to orient the central hot air towards the external louvres 60, 60'.

In accordance with FIG. 6, preferentially, the first assembly: fan 40, deflector 50 and external louvre 60 has a second mirror assembly 40', 50' and 60' on a central plane of symmetry, said plane of symmetry separating the open cooking appliance 1 into two symmetrical parts so as to obtain a lower cooking cassette 11 and an upper cooking cassette 11'.

Furthermore, if such assemblies are lacking, the lateral cold air flows rush in the central part and condensation may appear in the distal portion 3, 3' cooled by this cold air.

According to one embodiment, the isolation enclosures of the cooking appliance according to the invention have a length equal to the lateral dimension of the cooking cassettes. According to one embodiment, the isolation enclosures of the cooking appliance according to the invention are adapted to cover the ends of the radiant elements. According to one embodiment, the isolation enclosures have dimensions 5 to 15 millimetres greater than the dimensions of the end of the radiant elements.

The cooking appliance according to the invention is configured to receive, in its cooking chamber 13, cooking casseroles of various dimensions, for cooking foodstuffs.

According to one embodiment, the radiant elements 21, 21', 31, 31' have a specific geometric form, in particular the form of a circular disc, the form of a horizontal circular cylinder wound on itself or the form of a prism or the form of a cylindrical tube with a constant and rectilinear diameter.

According to one embodiment, the open faces of the lower cooking cassette 11 and upper cooking cassette 11' furthermore comprise a protective window. Such a protective window mechanically protects the at least one distal radiant element 31, 31' and the at least one proximal radiant element 21, 21' from any physical impact, protects the radiant elements from any dirt generated during cooking, helps to thermally isolate the radiants from the influence of cool air flow external to the cooking chamber and also contributes to better distribution of the heating effects of the various radiant elements. According to one embodiment, such a protective window is made from glass or vitreous ceramic. According to another embodiment, such a protective window is a metal protective grille.

According to an embodiment that is not illustrated, the upper cooking cassette 11' furthermore comprises a protective grille separating the at least one distal radiant element 31' and the at least one proximal radiant element 21' from the cooking chamber 13. According to one embodiment, such a protective window is made from glass or vitreous ceramic. According to another embodiment, such a protective window is a metal protective grille.

In a preferential embodiment, the cooking appliance according to the invention is configured to cook foodstuffs introduced into a cooking casserole placed in the cooking chamber 13, at a temperature from 40° C. to 98°.

According to one embodiment, the cooking appliance according to the invention is supplied by electricity.

According to one embodiment, the form of the isolation means 33, 33' depends on the location thereof with respect to the lower cooking cassette 11 or the upper cooking cassette 11'.

According to one embodiment, the isolation means 33, 33' of the distal external faces of the elements 332, 332' is composed of air or another insulator. In this embodiment, the distal part of the cooking cassettes 11, 11' is isolated against the cooling effects of the fan or fans 40, 40' (cf. FIG. 6) attached to the rear wall of the cooking appliance 1; the radiation emitted by the distal radiant elements 31, 31' are focused, directed and concentrated towards the distal part of the cooking chamber 13, which has an important advantage, in particular when large cooking casseroles are used.

According to one embodiment, the isolation means 34, 34' of the external faces of the elements 333, 333' is composed of air or another insulator.

According to one embodiment, the first reflector 331, 331' has a height of 0.5 to 10 centimetres. According to one embodiment, the first reflector 331, 331' has a height greater than the proximal radiant element 31, 31'. The height differential is measured by the vertical difference in level between the vertical centre of the radiant element 31 and the upper end of the element 331, between the centre of the radiant element 31' and the lower end of the element 331'. The greater this differential, the more the radiation from the radiant elements 31, 31' is oriented towards the targeted cooking zone, here the distal part of the cooking casseroles.

According to one embodiment, the second reflector 332, 332' has a height of between 0.5 and 10 centimetres. According to one embodiment, the second reflector 332, 332' has a greater height than the proximal radiant element 31, 31'. The height differential is measured by the vertical difference in level between the vertical centre of the radiant element 31 and the upper end of the element 332, between the vertical centre of the radiant element 31' and the lower end of the element 332'. The greater this differential, the more the radiation from the radiant elements is oriented towards the targeted cooking zone, here the distal part of the cooking casserole. The orientation is also consolidated by the angle α, α' which, according to one embodiment, varies from 85 to 140°. This vertical differential in height by a preferential embodiment between the vertical centre of the radiant element 31' and the lower end of the element 332' is accentuated by the lower end of the element 332' passing through the protective grille of the upper radiant elements.

According to one embodiment, the opening 334, 334' and the reflectors 331, 331', 332, 332', 333, 333' have the same lengths. According to one embodiment, as illustrated by FIGS. 3A and 3B, the opening 334, 334' and the reflectors 331, 331', 332, 332', 333, 333' have different lengths.

According to one embodiment, the open radiant cooking appliance 1 according to the invention comprises an ignition means. According to one embodiment, said ignition means is a remotely controllable switch or a remotely controllable electronic system.

According to one embodiment, the open radiant cooking appliance 1 according to the invention comprises a means for adjusting the cooking temperature. According to one embodiment, said means for adjusting the cooking temperature is also controllable remotely or a remotely controllable electronic system.

Sectorised Reflection of the Heating Tubes

Figure 7:
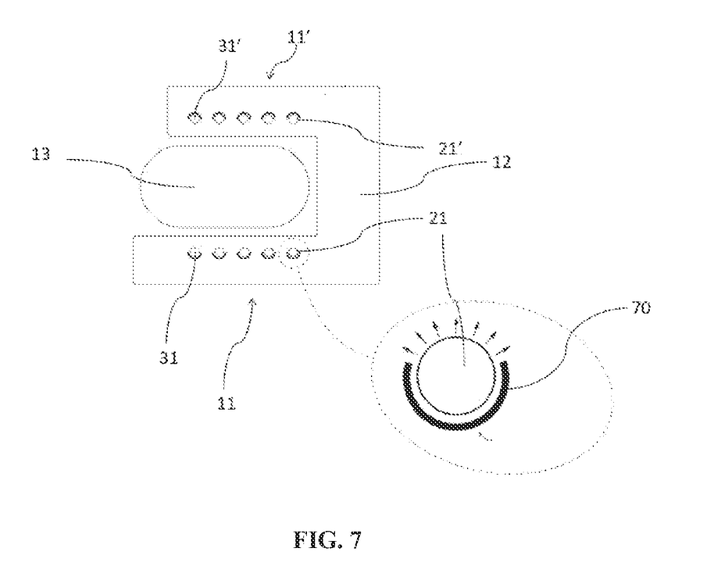
FIG. 7 illustrates a longitudinal section of an embodiment wherein the radiant elements of the invention are covered with a layer of insulating and reflective materials partially around and along their surface opposite to the cooking chamber.

With reference to FIG. 7, for the purpose of concentrating all the energy emitted by the proximal radiant elements 21, 21' or distal radiant elements 31, 31' towards the cooking casserole, said proximal or distal radiant elements receive a layer of insulating and reflective materials 70 around their face opposite to the cooking chamber 13.

The layer of insulating and reflective materials 70 partially surrounds the proximal radial elements 21, 21' or distal radiant element 31, 31' so as of course to allow a diffusion of energy towards the cooking chamber 13. The coverage is preferentially implemented all along the radial element 21, 21', 31, 31'.

Figure 8:
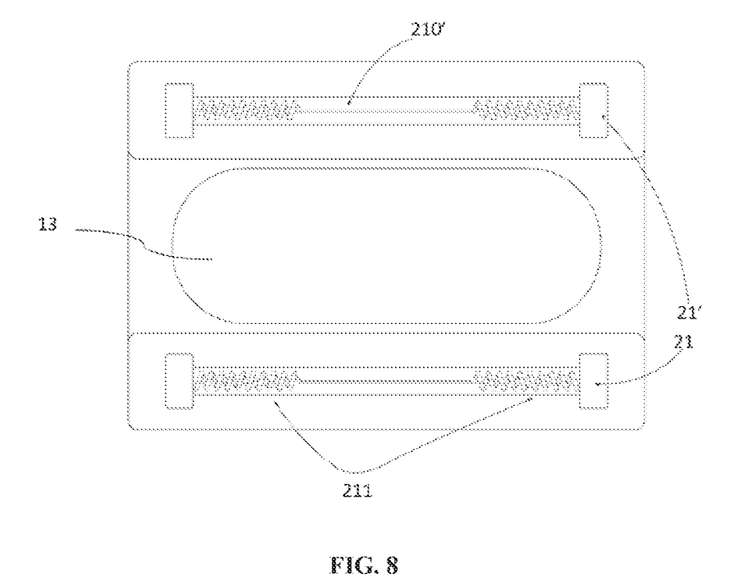
FIG. 8 illustrates a cross section of the cooking appliance according to the invention according to an embodiment wherein the radiant element selectively heats the lateral ends of the cooking chamber.

Sectorised Heating of the Tubes:

With reference to FIG. 8, and for the purpose of optimising the cooking zones selectively, adding heating elements 211 can be envisaged, designed in targeted heating zones towards the cooking chamber 13.

In FIG. 8, a configuration is illustrated wherein a central zone 210 is not heated while the ends 211 in a cross section of the cooking appliance according to the invention are for their part heated selectively.

Preferentially, as illustrated in FIG. 8, the heating zones 211 are symmetrically disposed on either side of the central zone 210'.

The embodiments with sectorised heating of the tubes, sectorised reflection of the heating tubes and isolation of the ends of the radiant elements can of course be combined in order to optimise the evenness of the cooking obtained by means of the cooking appliance according to the invention.

Though certain embodiments have been described and illustrated, the detailed description is not constructed to limit the invention. Numerous alternative embodiments can be implemented by a person skilled in the art without departing from the spirit and scope of the disclosure as defined by the claims.

EXAMPLE

Equipment and Methods

An open radiant cooking appliance according to the present invention and a cooking casserole containing a dauphinois gratin were used. Means for measuring the temperature of the dauphinois gratin in the cooking casserole were added so as to monitor the change in the cooking temperature of the dauphinois gratin at various points in the cooking casserole.

The cooking casserole containing the gratin was placed in the cooking chamber of the open radiant cooking appliance and heated to a "target" temperature of 93 or 94° C. at the core of the gratin and 98° C. on the surface of the gratin. The temperature is measured at various points on the cooking casserole.

Results

The temperature of the gratin measured at the core of the gratin at the centre and at the periphery of the dish is 93 or 94° C. On the surface of the gratin it reached 97 or 98° C.

Compared with the prior art presented above, the cooking temperature differential was reduced significantly (previous difference of 20° C. reduced by this technological innovation to 1° C.) thus allowing perfectly even cooking and browning unlike what could be observed previously. This is because, with the appliances of the prior art, to obtain even cooking and browning, it was necessary, during cooking, to pivot the cooking casserole through 180° (the front face of the cooking casserole being positioned thereby at the back of the cooking chamber), a manipulation that is constraining and impractical.

The invention claimed is:

1. An open radiant cooking appliance having a C shape or a U shape and comprising a lower cooking cassette; an upper cooking cassette; and a posterior part defining together a cooking chamber; said appliance comprising:
   a proximal portion comprising at least one proximal radiant element;
   a distal portion comprising at least one distal radiant element; and
   at least one isolation means, separating the at least one distal radiant element from the at least one proximal radial element;
   said isolation means comprising at least one first reflector configured for directing the radiation emitted by the at least one distal radiant element towards the cooking chamber and wherein the inclination of the at least one first reflector with respect to a lower horizontal surface of the lower cooking cassette forms an angle β of between 70° and 120°.

2. The open radiant cooking appliance according to claim 1, wherein the at least one isolation means of a lower part of the appliance furthermore comprises at least one second reflector.

3. The open radiant cooking appliance according to claim 2, wherein said at least one first reflector and said at least one second reflectors are connected together by at least one third reflector.

4. The open radiant cooking appliance according to claim 2, wherein the inclination of the at least one second reflector with respect to the lower horizontal surface of the lower cooking cassette forms an angle α of between 85° and 140°.

5. The open radiant cooking appliance according to claim 2, wherein the inclination of the at least one second reflector with respect to an upper horizontal surface of the lower cooking cassette forms an angle α' of between 85° and 140°.

6. The open radiant cooking appliance according to claim 2, wherein
   the lower cooking cassette comprises a lower second reflector and wherein the inclination of the lower second reflector with respect to a lower horizontal surface of the lower cooking cassette forms an angle α of between 85° and 140°; and
   the upper cooking cassette comprises an upper second reflector and wherein the inclination of the upper second reflector with respect to an upper horizontal surface of the upper cooking cassette forms an angle α' of between 85° and 140°.

7. The open radiant cooking appliance according to claim 6, wherein the lower second reflector and the upper second reflector are symmetrical around a horizontal plane.

8. The open radiant cooking appliance according to claim 1, wherein at least one isolation means partially surrounds a distal radiant element; said at least one isolation means comprising an opening directed towards the cooking chamber.

9. The open radiant cooking appliance according to claim 8, wherein the opening of an isolation means of the distal portion is configured to be parallel to and/or opposite the opening of an isolation means of the distal portion.

10. The open radiant cooking appliance according to claim 1, wherein the inclination of the at least one first reflector with respect to a horizontal surface of the upper cooking cassette is inclined with respect to the plane of the upper part, and forms an angle β' of between 70° and 120°.

11. The open radiant cooking appliance according to claim 1, wherein the proximal portion comprises a 1 to 20 proximal radiant elements.

12. The open radiant cooking appliance according to claim 1, wherein the distal portion comprises at least one distal radiant element.

13. The open radiant cooking appliance according to claim 1, wherein power of the at least one distal radiant element is identical to or greater than power of the at least one proximal radiant element.

14. The open radiant cooking appliance according to claim 1, comprising at least one additional reflector partially closing a lateral surface of the cooking chamber.

15. The open radiant cooking appliance according to claim 1, wherein the lower and upper cooking cassettes are attached to internal flanks that comprise at least one elongate additional isolation means closed at its ends.

16. The open radiant cooking appliance according to claim 1, wherein
the lower cooking cassette comprises a lower first reflector and wherein the inclination of the lower first reflector with respect to a lower horizontal surface of the lower cooking cassette forms an angle β of between 70° and 120°; and
the upper cooking cassette comprises an upper first reflector and wherein the inclination of the upper first reflector with respect to an upper horizontal surface of the upper cooking cassette forms an angle β' of between 70° and 120°.

17. The open radiant cooking appliance according to claim 16, wherein the lower first reflector and the upper first reflector are symmetrical around a horizontal plane.

* * * * *